US006337877B1

(12) United States Patent
Cole et al.

(10) Patent No.: US 6,337,877 B1
(45) Date of Patent: Jan. 8, 2002

(54) METHOD AND APPARATUS FOR SCALING MODEM TRANSFER CAPACITY IN A MULTI-CHANNEL COMMUNICATIONS SYSTEM

(75) Inventors: Terry L. Cole; Glen W. Brown, both of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/141,216

(22) Filed: Aug. 27, 1998

(51) Int. Cl.[7] .............................. H04B 1/38; H04L 5/16; H04L 27/28; H04K 1/10
(52) U.S. Cl. ....................................... 375/222; 375/260
(58) Field of Search .................................. 375/222, 260; 370/349, 352

(56) References Cited

U.S. PATENT DOCUMENTS

| | | | | |
|---|---|---|---|---|
| 4,271,510 A | * | 6/1981 | Looschen | 370/110 |
| 4,280,221 A | * | 7/1981 | Chun et al. | 375/17 |
| 5,402,473 A | * | 3/1995 | Taki et al. | 379/93 |
| 5,495,483 A | | 2/1996 | Grube et al. | 370/95.1 |
| 5,644,573 A | * | 7/1997 | Bingham et al. | 370/503 |
| 5,682,419 A | | 10/1997 | Grube et al. | 379/60 |
| 5,970,088 A | * | 10/1999 | Chen | 375/222 |
| 6,002,682 A | * | 12/1999 | Bellenger et al. | 370/352 |
| 6,026,097 A | | 2/2000 | Voois et al. | 370/468 |
| 6,073,179 A | * | 6/2000 | Liu et al. | 709/229 |
| 6,088,385 A | * | 7/2000 | Liu | 375/219 |
| 6,125,277 A | * | 9/2000 | Tanaka | 455/436 |

FOREIGN PATENT DOCUMENTS

| EP | 0831624 A2 | 3/1998 | ........... H04L/27/00 |

OTHER PUBLICATIONS

T1.413 Issue 2, dated Jun. 1, 1998.
International Search Report dated Dec. 18, 1998 (PCT/US98/26953; TT2316–PCT).
International Search Report dated Dec. 18, 1998 (PCT/US98/26958; TT2379–PCT).
European Search Report dated May 12, 1991 (Application No. 89 11 8822).
Maxwell, Asymmetric Digital Subscriber Line: Interim Technology for the Next Forty Years, IEEE Communications Magazine, 34(10): 100–106, Oct. 1996.
International Search Report dated Feb. 26, 1999 (PCT/US99/04308).

* cited by examiner

Primary Examiner—Stephen Chin
Assistant Examiner—Tony Al-Beshrawi
(74) Attorney, Agent, or Firm—Williams, Morgan & Amerson, P.C.

(57) ABSTRACT

A communications system includes a plurality of lines, a modulator/demodulator, a processing unit, and a negotiation unit. The modulator/demodulator is coupled to the lines and adapted to communicate data over the lines using a plurality of tone sets. Each tone set is associated with a particular line. The processing unit has an amount of available processing resources for supporting the modulator/demodulator and is adapted to generate resource availability data based on the amount of available processing resources. The negotiation unit is adapted to receive the resource availability data from the processing unit and determine a subset of available tones within each tone set based on the resource availability data. The modulator/demodulator is adapted to communicate data on each line using the subset of available tones. A method for allocating the resources of a communications system includes determining an amount of available processing resources for a processing unit. The processing unit is adapted to support a plurality of connections over a plurality of lines. Each connection has an associated tone set for communicating data. A first connection is established over a first line. A first portion of the available processing resources is allocated to the first connection. A first tone range is determined based on the first portion. The first tone range is a subset of the tone set associated with the first line.

20 Claims, 8 Drawing Sheets

METHOD AND APPARATUS FOR SCALING MODEM TRANSFER CAPACITY IN A MULTI-CHANNEL COMMUNICATIONS SYSTEM

BACKGROUND OF THE INVENTION

1. Field of the Invention

The present invention relates generally to modem communications, and more particularly, to the scaling of modem transfer capacity.

2. Description of the Related Art

As the complexity of online content grows, many users find that typical connections, such as a 28.8 KBPS modem, are simply not fast enough. Even newer modems allowing communication speeds of 56.6 KBPS seem slow in some applications. A common bottleneck in online applications, such as the Internet, is telecommunications bandwidth. Projected demand for additional services, such as video-on-demand, teleconferencing, interactive TV, and the like is likely to exacerbate the bandwidth problem.

One telecommunications protocol designed to alleviate the bandwidth problem is described in the asymmetric digital subscriber line (ADSL) standard, ANSI T1.413 Issue 2, entitled, "Interface Between Networks and Customer Installation—Asymmetric Digital Subscriber Line (ADSL) Metallic Interface, Rev. R1, dated May 4, 1997 incorporated herein by reference in its entirety.

The technology employed in T1.413 type modems is termed discrete multi-tone. The standard defines 256 discrete tones. Each tone represents a carrier signal that can be modulated with a digital signal for transmitting data. The specific frequency for a given tone is N=4.3125 KHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asynchronous.

Through a training procedure, the modems on both sides of the connection sense and analyze which tones are clear of impairments in the telephone line. Each tone that is clear is used to carry information. Accordingly, the maximum capacity is set by the quality of the telephone connection. The data rate defined by the ADSL specification, assuming all tones are clear of impairments, is about 8 MBPS downstream and about 640 KBPS upstream.

Figure 1:
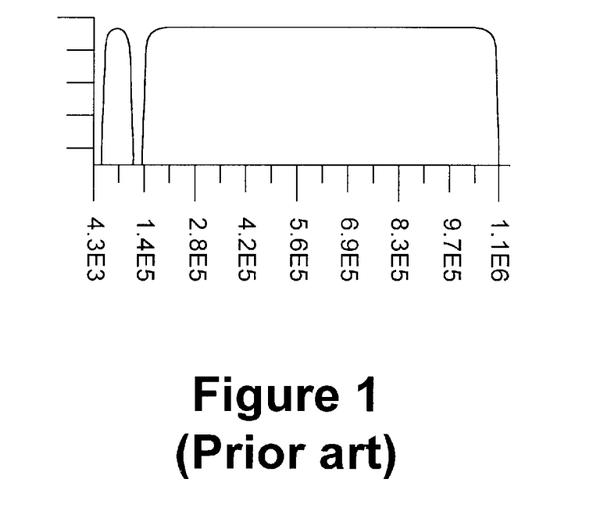
FIG. 1 is a graph of the bandwidth spectrum for a prior art ADSL modem.

FIG. 1 illustrates the bandwidth requirements for an ADSL modem using these parameters. To support the frequency bandwidth shown in FIG. 1, the ADSL modem must have an analog sampling rate of at least 2.2E+6 samples per second.

The ADSL modem described above has a high bandwidth for transmitting data, but is inflexible. All potential installations might not require the same bandwidth. Also, some users may require a more balanced bandwidth ratio. In addition, due to the algorithm processing requirements, storage requirements, power consumption, gate count, analog sample converter rate, and physical size required to support the bandwidth shown in FIG. 1, the modem is costly, which may preclude its use for certain applications.

The present invention is directed to overcoming, or at least reducing the effects of, one or more of the problems set forth above.

SUMMARY OF THE INVENTION

In one aspect of the present invention, a communications system includes a plurality of lines, a modulator/demodulator, a processing unit, and a negotiation unit. The modulator/demodulator is coupled to the lines and adapted to communicate data over the lines using a plurality of tone sets. Each tone set is associated with a particular line. The processing unit has an amount of available processing resources for supporting the modulator/demodulator and is adapted to generate resource availability data based on the amount of available processing resources. The negotiation unit is adapted to receive the resource availability data from the processing unit and determine a subset of available tones within each tone set based on the resource availability data. The modulator/demodulator is adapted to communicate data on each line using the subset of available tones.

In another aspect of the present invention, a method is provided for allocating the resources of a communications system. The method includes determining an amount of available processing resources for a processing unit. The processing unit is adapted to support a plurality of connections over a plurality of lines. Each connection has an associated tone set for communicating data. A first connection is established over a first line. A first portion of the available processing resources is allocated to the first connection. A first tone range is determined based on the first portion. The first tone range is a subset of the tone set associated with the first line.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
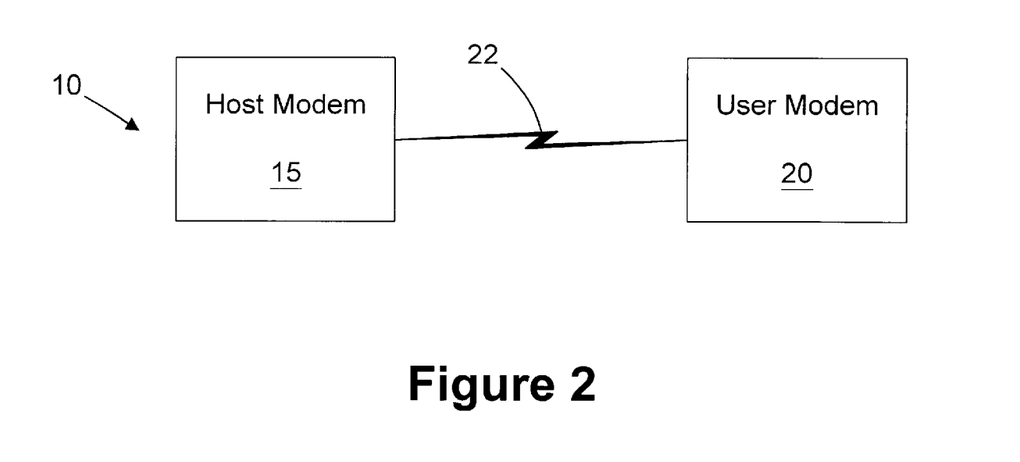
FIG. 2 is a block diagram of a communications system of the present invention.

Referring to FIG. 2, a block diagram of a communications system 10 is provided. The communications system 10 includes a host modem 15 coupled to a user modem 20 by a connection 22. In the illustrated embodiment, the connection is an ordinary twisted pair connection, as is common in present day telephone networks. However, other connection types are contemplated, depending on the specific implementation.

The host and user modems 15, 20 are each capable of using only a certain number of tones for data transmission, up to and including the 256 tones described above. A modem 15, 20 in accordance with the present invention uses less tones than the full bandwidth modem (not shown) described above and is referred to as a mid-band modem 25, which is described in greater detail below in reference to FIG. 3. The mid-band modem 25 is capable of using the same ADSL protocols and algorithms as a full-band modem (not shown), with the exception of the number of tones. For example, the mid-band modem 25 may use the same rate adaptive features as a full-band modem (not shown). Also the mid-band modem 25 may operate in a single latency mode (ie., all data allocated either the fast path or the interleaved path) or a dual latency path (i.e., data allocated to both paths).

Scaling the maximum transport capacity of the modems 15, 20 by reducing the number of tones has numerous advantages. For example, an application in which the user modem 20 is used may not require the full bandwidth capacity of the host modem 15. Accordingly, the user modem 20 may be manufactured less expensively, thus increasing its range of installation environments and consumer applications. Also, it may be desirable for the host modem 15 to intentionally scale the transfer capacity of the user modem 20 to regulate maximum throughput based on some program parameter. For example, the host modem 15 may set the maximum allowable speed of the user modem 20 based on the rate paid by the user.

Figure 3:
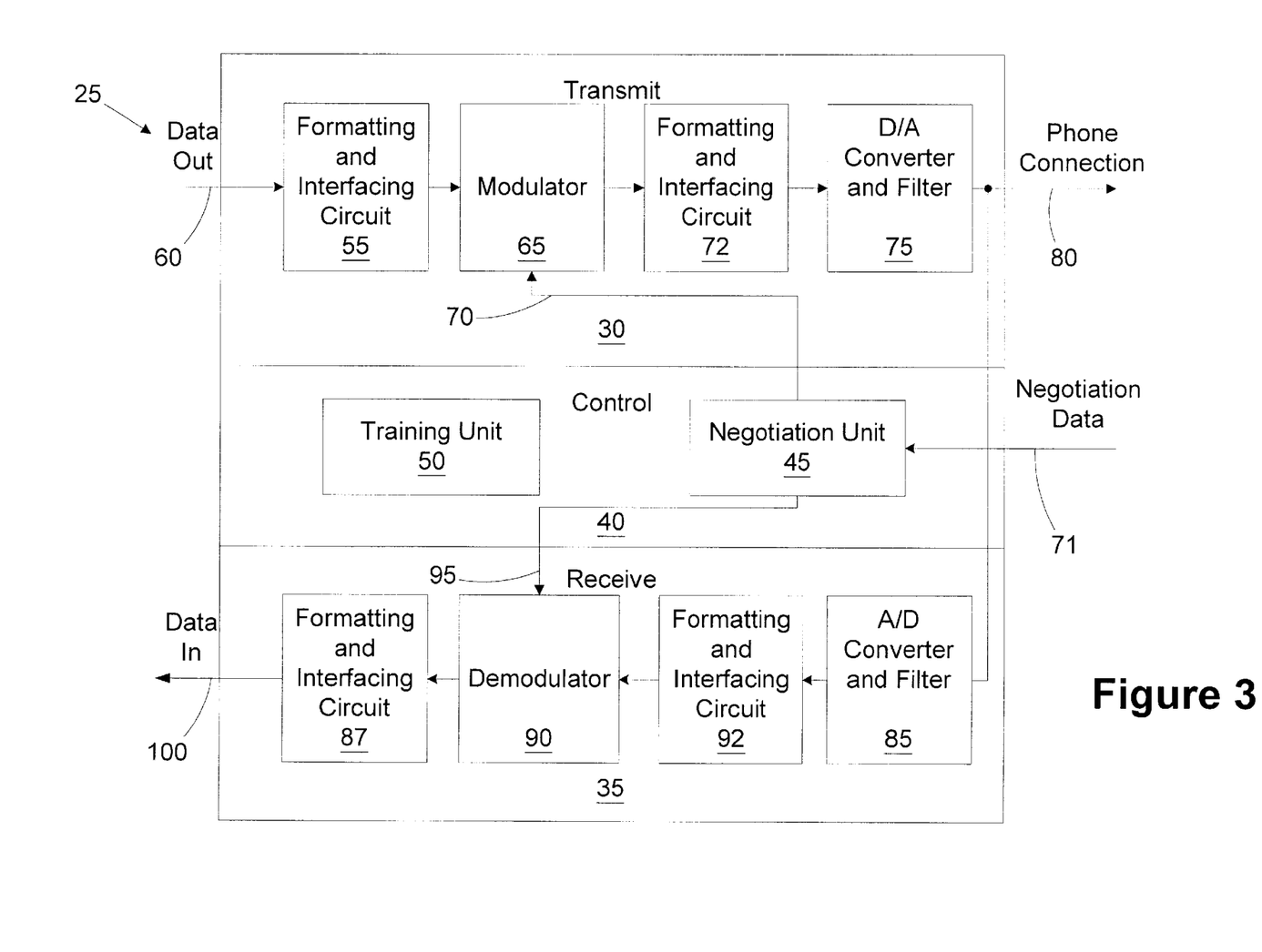
FIG. 3 is a block diagram of a mid-band modem of the present invention.

Referring to FIG. 3, a simplified block diagram of the mid-band modem 25 is provided. For clarity and ease of illustration, not all functional blocks are illustrated in detail, because these items are known to one of ordinary skill in the art, and are further defined in documents such as the T1.413 Issue 2 standard. The mid-band modem 25 may function as the host modem 15 or the user modem 20, depending on its configuration. As described above, the host modem 15 typically includes a larger number of tones dedicated for transmitting data (downstream tones) and less tones for receiving data (upstream tones). Conversely, the user modem 15 typically includes a larger number of tones dedicated for receiving data and less tones for transmitting data.

The mid-band modem 25 includes transmit, receive, and control functional blocks 30, 35, 40. In the control block 40, a negotiation unit 45 identifies the greatest common tone set supportable by the modem 25 and the interfacing modem (not shown) to which the modem 25 is connected. The upstream and downstream tone sets of the mid-band modem 25 are intersected with the corresponding upstream and downstream tone sets for the interfacing modem (not shown) to determine the greatest common tone set. As described above, the negotiation unit 45 may limit the usable tones to a subset of the greatest common tones for some predetermined reason (e.g., rate paid). A training unit 50 trains the supported tones to identify those free of impairments. The negotiation unit 45 and training unit 50 configure the other elements in the transmit and receive blocks 30, 35, however, for clarity, all physical connections between these elements are not shown.

The transmit block 30 includes a formatting and interfacing circuit 55 adapted to receive outgoing digital data over a data-out line 60. The formatting and interfacing circuit 55 performs functions such as cyclic redundancy checking (CRC), scrambling, forward error correction, and interleaving. As stated above, these functions are known to those of ordinary skill in the art (T1.413 Issue 2).

The transmit block 30 also includes a modulator 65. The modulator 65 has a control input 70 adapted to receive tone range information from the negotiation unit 45. The tone range information specifies the tone ranges for upstream and downstream data transfer. The tone ranges may be less than or equal to the total tone capabilities of the mid-band modem 25, depending on the characteristics of the interfacing modem (not shown). For example, the mid-band modem 25 may be a user modem 20 connected to a host modem 15 having full bandwidth capabilities. For some reason (e.g., rate paid, time-of-day, etc.), the host modem 15 limits the number of tones available to the mid-band modem 25.

The negotiation unit 45 communicates with the interfacing modem (not shown) to determine the maximum allowable tone ranges. The negotiation unit 45 provides the negotiated tone ranges to the modulator 65 as the control input 70. In the illustrated embodiment, the negotiation unit 45 may provide the maximum downstream tone, the maximum upstream tone, and the first usable tone, or simply the lowest and highest tones available for transmitting data. It is contemplated that the tone ranges may be specified using other conventions, depending on the specific configuration.

The negotiation unit 45 has a control input adapted to receive negotiation data over line 71. The negotiation data may be provided by an external device, such as a computer (not shown) coupled to the modem 25. The negotiation data provides parameters to the negotiation unit 45 related to the number of allocable tones. The number of allocable tones may be less than the number of tones supported by the modem 25. The number of allocable tones may be reduced for various reasons, including rate paid by the user, available host resources, available user resources, etc. Examples where the negotiation data is used to limit the number of allocable tones are described in greater detail below.

The modulator 65 receives data from the formatting and interfacing circuit 55, performs tone ordering, constellation encoding, and gain scaling functions in accordance with the number of available tones, and modulates the tone carriers with the data. A second data formatting and interfacing circuit 72 in the transmit block 30 inserts a cyclic prefix to the output of the modulator 65 (ie., a portion of the output samples from the modulator 65 is replicated and appended to the existing output samples to provide an overlap and allow for better frame alignment when the output from the modem 25 signal is ultimately received by an interfacing modem (not shown). The formatting and interfacing circuit 72 also buffers the output samples. The digital to analog (D/A) converter and filter 75 converts digital output samples from the formatting and interfacing circuit 72 to an analog waveform suitable for transmission over a phone connection 80.

The receive block 35 includes an analog to digital (A/D) converter and filter 85 that receives an analog waveform over the phone connection 80 and samples the analog waveform to generate a digital signal. A formatting and interfacing circuit 87 performs the functions known in the art such as frame alignment and time domain equalization. In time domain equalization, because the tones are at different frequencies, certain frequencies travel faster than others, and as such, all the tones do not arrive at same time. The time domain equalization function of the formatting and interfacing circuit 87 delays the faster tones to compensate for the propagation speed differences. There is a performance trade off between the frame alignment and time domain equalization functions in that a higher degree of frame alignment accuracy allows a lesser degree of accuracy in time domain equalization. The cyclic prefix insertion performed by the interfacing modem (not shown) improves frame alignment accuracy. The formatting and interfacing circuit 72 also performs gain control to increase the amplitude of the received signal.

A demodulator 90 receives digital signal data from the formatting and interfacing circuit 87 and converts the time domain data from the formatting and interfacing circuit 87 to frequency domain data to recover the tones. The demodulator 90 includes a control input 95 that receives the negotiated tone ranges available for receiving data. The demodulator 90 performs a slicing function to determine constellation points from the constellation encoded data, a demapping function to map the identified constellation point back to bits, and a decoding function (e.g., Viterbi decoding if trellis constellation coding is employed). The demodulator 90 also performs tone deordering to reassemble the serial bytes that were divided among the available tones. A second formatting and interfacing circuit 92 in the receive block 35 performs forward error correction, CRC checking, and descrambling functions on the data received from the demodulator 90. The reconstructed data provided by the formatting and interfacing circuit 92 represents the sequential binary data that was sent by the interfacing modem (not shown). The reconstructed data is provided to a data-in line 100.

The negotiation unit 45 is illustrated as part of the mid-band modem 25, however, it is contemplated that only one of the host or user modems 15, 20 may contain a negotiation unit 45. Information regarding the available tone ranges may be stored in a register (not shown) on the modem 15, 20 not having the negotiation unit 45 and transmitted to the modem 15, 20 having the negotiation unit 45. Alternatively, the negotiation unit 45 may reside in additional hardware (not shown) external to both the host and user modems 15, 20.

Figure 4:
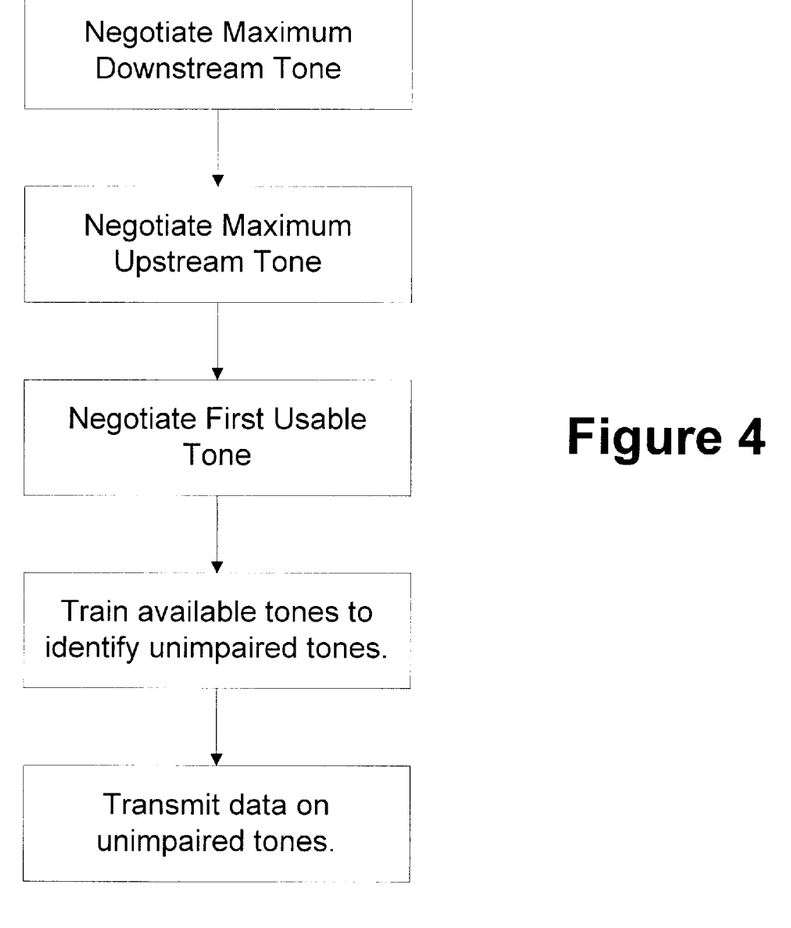
FIG. 4 is a flow chart of a method for scaling the bandwidth of a modem in accord with the present invention.

Referring to FIG. 4, a method for scaling the bandwidth of the user modem 20 is provided. As stated above, the user modem 20 may only support a limited number of the tones, or the host modem 15 may limit the usable tones of the user modem 20 for various reasons. The method includes negotiating the maximum upstream tone and the maximum downstream tone. The maximum upstream and downstream tones define the bandwidth available for transmitting downstream data. The method also includes negotiating the first usable tone. The first usable tone and the maximum upstream tone define the bandwidth available for transmitting upstream data. The available tones in the defined tone ranges are trained to identify those tones that are free of impairments. After training, the available, unimpaired tones can be used to transmit data.

The steps involved in negotiating the tone ranges may be performed in any order. It is contemplated that negotiating the tone ranges may be performed using a handshaking procedure during the initialization of the connection between the host modem 15 and the user modem 20. It is also contemplated that the negotiation may be conducted before or after training the tones to identify impairments. The negotiation may include transmitting a parameter indicative of the tone ranges, or the negotiation may be conducted by default during the training process (e.g., the maximum downstream tone is evident from the training procedure failing to train the higher tones). Either the host modem 15 or the user modem 20 may initiate the negotiating and training procedure. The following examples illustrate how the host modem 15 and the user modem 20 may negotiate the tone ranges to vary the bandwidth characteristics of the connection.

Figure 5:
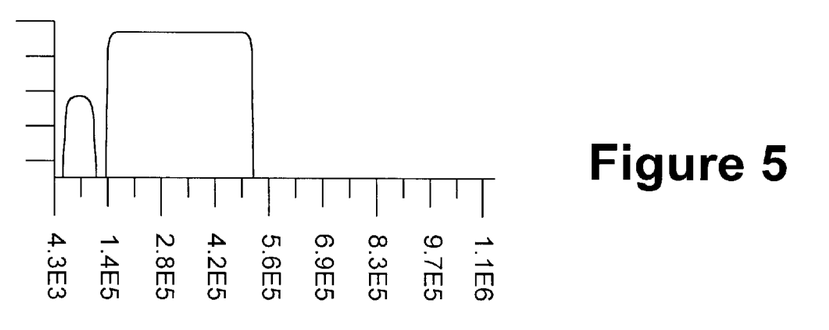
FIGS. 5–9 are graphs of exemplary bandwidth spectrums for a mid-range modem of the present invention.

FIG. 5 illustrates the bandwidth spectrum for a maximum downstream tone of 96. Because of the reduced bandwidth, the user modem 20 can use an analog sampling frequency of 1.1E+6 samples per second, which is half that of the full-band modem (not shown) characterized by FIG. 1. Also, the algorithm processing requirements of the user modem 20 characterized by FIG. 4 are reduced by 50% due to the decreased bandwidth.

Figure 6:
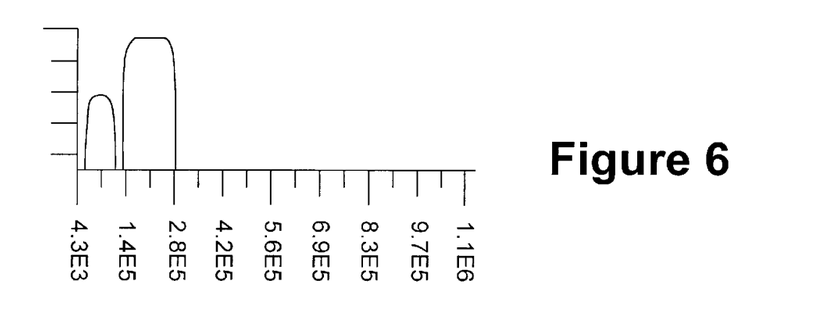

FIG. 6 illustrates the bandwidth spectrum for a maximum downstream tone of 64. The analog sampling frequency for the user modem 20 is 0.56E+6 samples per second. The analog sampling frequency and the algorithm processing requirements are 25% of the full-band modem (not shown).

Figure 7:
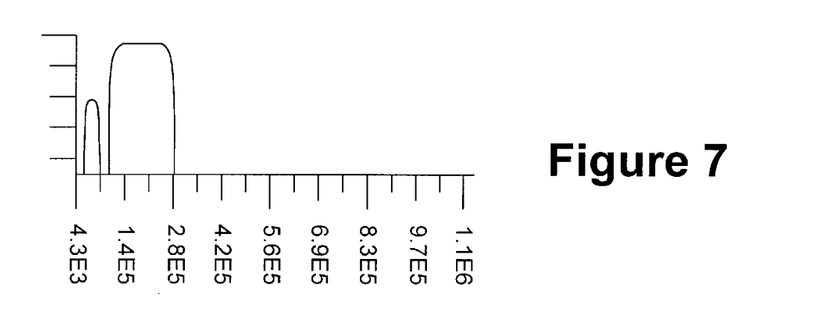

FIG. 7 illustrates the bandwidth spectrum for a maximum downstream tone of 64 and a maximum upstream tone of 24. Eight tones are shifted from the typical upstream band (tones 8–32) to the downstream band, thus maintaining the same ratio between upstream and downstream tones as the full-band modem (not shown).

Figure 8:
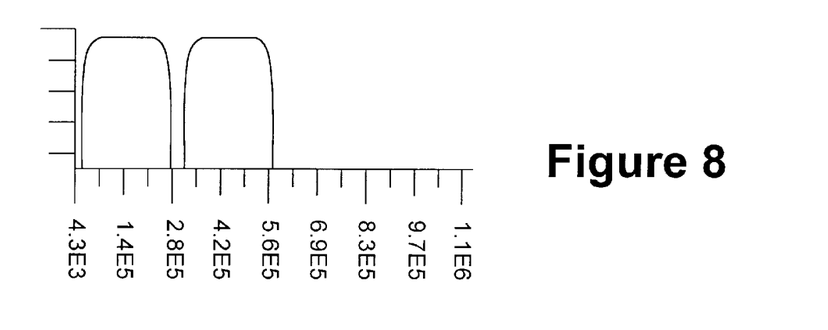

FIG. 8 illustrates the bandwidth spectrum for a maximum downstream tone of 128 and a maximum upstream tone of 64. The balanced or symmetric split of data bandwidth illustrated in FIG. 8 may be useful in applications such as a small business Web server or other such situation where downstream throughput is not significantly higher than upstream throughput. This configuration could also be modified to move the upstream data further away from the voice band for increased isolation without losing upstream throughput.

Figure 9:
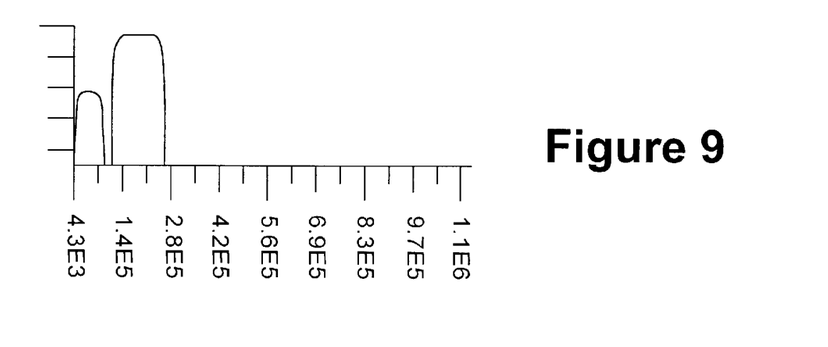

FIG. 9 illustrates the bandwidth spectrum for a maximum downstream tone of 64 and a maximum upstream tone of 24. The first available upstream tone is tone 1. The voice and guard tones are used as upstream tones for an application where no POTS (plain old telephone system) band is necessary. Some installations are not intended for dual POTS/data use. Accordingly, the lower tone bandwidth can be recaptured and used for data transfer, resulting in lower cost (ie., less total bandwidth) or increased bandwidth (i.e., for the same maximum downstream tone).

In some applications, a splitter is sometimes required to isolate the voice band from the data bands. It would reduce the cost and complexity of the installation if the use of a splitter could be avoided. In cases where crosstalk or other interference precludes a splitterless installation, the data bands could be shifted to higher tones, thus providing a greater guard band and better isolating the voice signals from the data signals. It may not be possible in all applications to remove the splitter without introducing in-line filters, because some phones may malfunction in the presence of ADSL spectrum energy. However, the added flexibility provided by moving the tone bands may reduce the number of applications requiring additional filters. Another option for reducing the problem of interference in a splitterless application is to reduce the power level of the upstream signals, as shown in FIGS. 5–7 and 9.

It is also contemplated that the available tone range could be renegotiated based on the present state of the POTS band. For example, if the POTS band has not been used for a specified time interval, the tones could be renegotiated to take advantage of the unused bandwidth. If a user subsequently wanted to place a voice call, renegotiation could be conducted to preclude use of the voice band tones.

In the description above, the host modem 15 is a full-band ASDL modem. It is contemplated that both the host and the user modem 15, 20 may have mid-band tone ranges, and the mid-band ranges may be the same or different. The negotiating process allows the modems 15, 20 to establish their individual bandwidth capabilities and establish a greatest common set of available tones. Accordingly, any mid-band modem could interoperate with any other mid-band or full-band modem.

Varying the upstream and downstream tone ranges provides enhanced flexibility for adapting to different user requirements. Numerous advantages are achievable by manipulating the ranges. The added flexibility allows the bandwidth to be tailored to small business, work-at-home, and consumer requirements. The user modem 20 with mid-band capability provides a higher bandwidth than conventional modems, but less than a full-band ADSL modem (not shown). Reducing the maximum throughput of the user modem 20 (i.e., by using a mid-band configuration) will reduce the processing requirements, analog sampling rates, and gate counts. These reductions allow for reduced complexity, higher degree of silicon integration, denser equipment configurations, and power savings.

Figure 10:
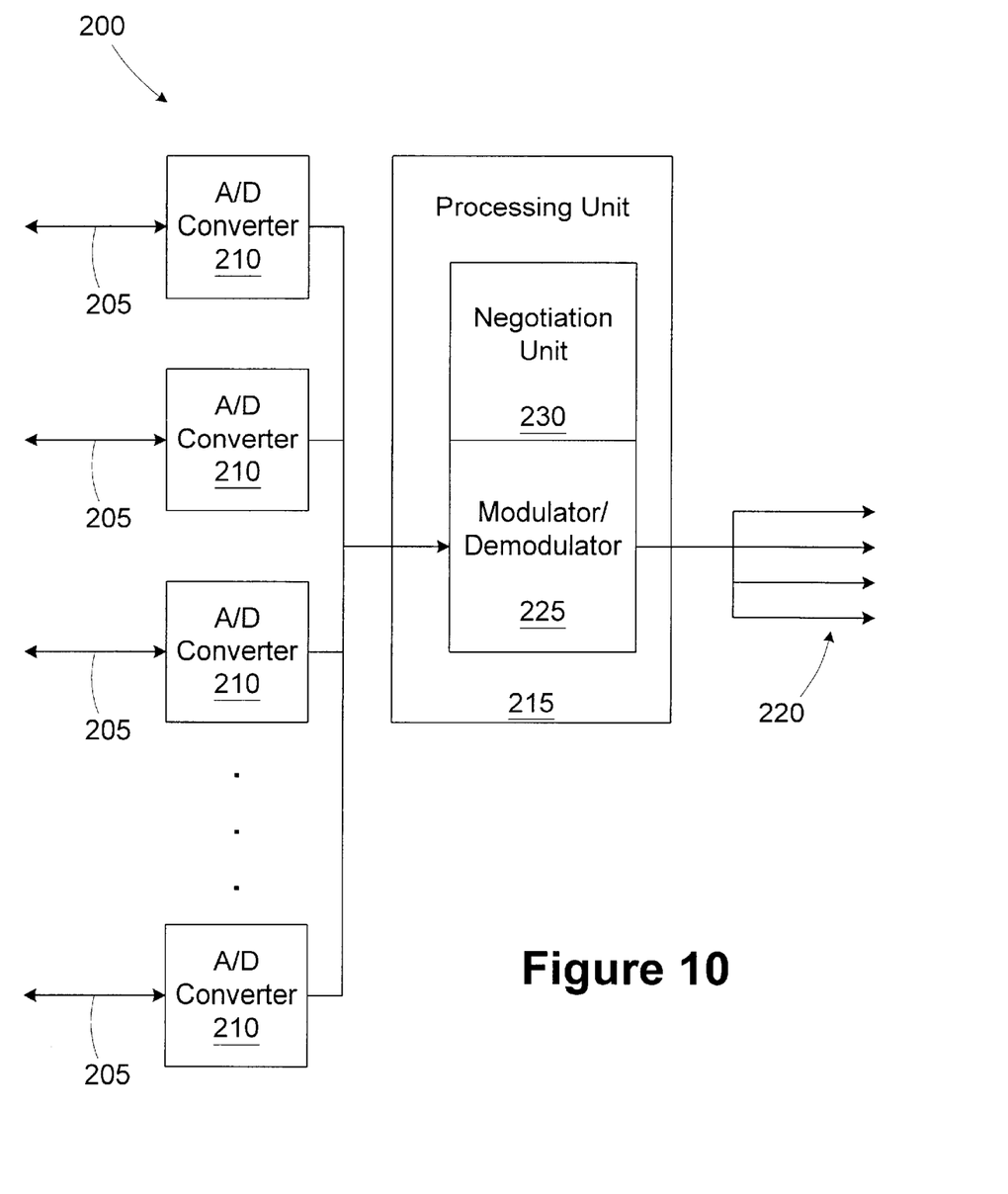
FIG. 10 is a block diagram of a central office for distributing data.

Referring to FIG. 10, a block diagram of a central office 200 for distributing data is provided. A plurality of lines 205 (e.g., telephone lines) are present for communicating with a plurality of user modems (not shown). The lines 205 are coupled to A/D converters 210. The A/D converters 210 are coupled to a processing unit 215. The processing unit 215 is coupled to a communication network 220 (e.g., the Internet, a local area network, a wide area network, etc.). The processing unit 215 includes a modulator/demodulator 225 and a negotiation unit 230. The processing unit 215 provides processing resources to support the modulator/demodulator 225 functions (e.g., cyclic redundancy checking (CRC), scrambling, forward error correction, interleaving, tone ordering, constellation encoding, and gain scaling). The negotiation unit 230 negotiates tone ranges with the connected user modems (not shown). The negotiation unit 230 may be separate from the processing unit 215, or may be implemented by hardware or software within the processing unit 215.

The processing unit 215 is a shared resource that supports communication over the lines 205. To reduce hardware costs, the processing unit 215 is capable of supporting only a certain number of full bandwidth connections less than the total number of lines 205. For example, if six lines 205 are received into the central office 200, it is statistically unlikely that all six lines 205 will be active at a given time. Therefore, rather than providing sufficient resources (e.g., number of processors, processor speed, bus bandwidth, memory, electrical power, etc.) in the processing unit 215 to support all six lines 205, it is possible to provide only resources for a lesser number of lines 205 (e.g., 4 lines). Without bandwidth scaling it would be necessary to refuse connections to a fifth caller if four lines 205 are in use. By scaling the bandwidth of the connected user modems (not shown), it is possible to support more than the four users that can be supported using full bandwidth connections.

The amount of resources may be approximately measured in resource units, where the number of resource units approximately equals the number of full bandwidth connections the processing unit 215 can support. Resource units are used to illustrate how the resources of the processing unit 215 may be shared. In an actual implementation, the resources of the processing unit 215 may be shared with or without defining resource units.

When a user modem (not shown) initiates a connection over one of the line 205, the processing unit 215 determines the maximum processing capability, maximum throughput, and minimum latency that can be supported for the connection. Based on this determination, the processing unit 215 instructs the negotiation unit 230 to provide a full bandwidth connection or to scale the bandwidth by limiting the number of tones available. The following example illustrates how the processing resources of the processing unit 215 may be shared. In the illustrated example the processing unit 215 has sufficient resources to support four full bandwidth connections (i.e., four processing units).

A first user modem (not shown) may be allocated a full bandwidth connection, thus using one of the four available resource units available to the processing unit 215. The negotiation unit 230 in cooperation with the processing unit 215 recognizes that four resource units (i e., resources to support four full bandwidth connections) are available. The negotiation unit 230 negotiates with the first user modem (not shown) and allows the first user modem (not shown) to use all of its available tones. A second user modem (not shown) connecting to the central office 200 may also be allocated a full bandwidth connection, thus employing the second resource unit. When a third user modem (not shown) establishes a connection, the processing unit 215 realizes that it only has two remaining resource units. To retain a processing resource reserve, the processing unit 215 instructs the negotiation unit 230 to negotiate a half bandwidth connection with the third user modem (not shown). The negotiation unit 230 limits the maximum downstream tone of the third user modem (not shown) to 96, as illustrated in FIG. 5. If desired, the negotiation unit 230 could also limit the maximum upstream tone to reduce the upstream bandwidth. A fourth user modem (not shown) could also be limited by the negotiation unit 230 to a 50% connection, or the negotiation unit 230 could further reduce the bandwidth to a 33% connection to retain an additional resource reserve. Subsequent user modems (not shown) could also be limited by the negotiation unit 230 such that all six lines 205 could be used concurrently, albeit with less than full bandwidth capabilities.

Many different allocation policies for pooling resource units of the processing unit 215 are contemplated. The negotiation unit 230 in cooperation with the processing unit 215 could use simple percentages to scale additional user modems (not shown), as described above, or alternatively, the degree of bandwidth scaling could be affected by other variables, such as usage history. For example, use data related to the likelihood of having n connections at any particular time of the day could be factored into the amount of bandwidth allocated to any particular user modem (not shown). By pooling the resources of the processing unit 215, hardware costs and the amount of unused or rarely used processing resources are reduced.

It is also contemplated that the central office 200 could renegotiate any or all of the current connections in response to a new connection. For example, if the user trying to establish a new connection pays a higher rate to guarantee a minimum bandwidth, the existing connections could be renegotiated to make that bandwidth available. The central office 200 may renegotiate connections at any time to reallocate bandwidth.

Figure 11:
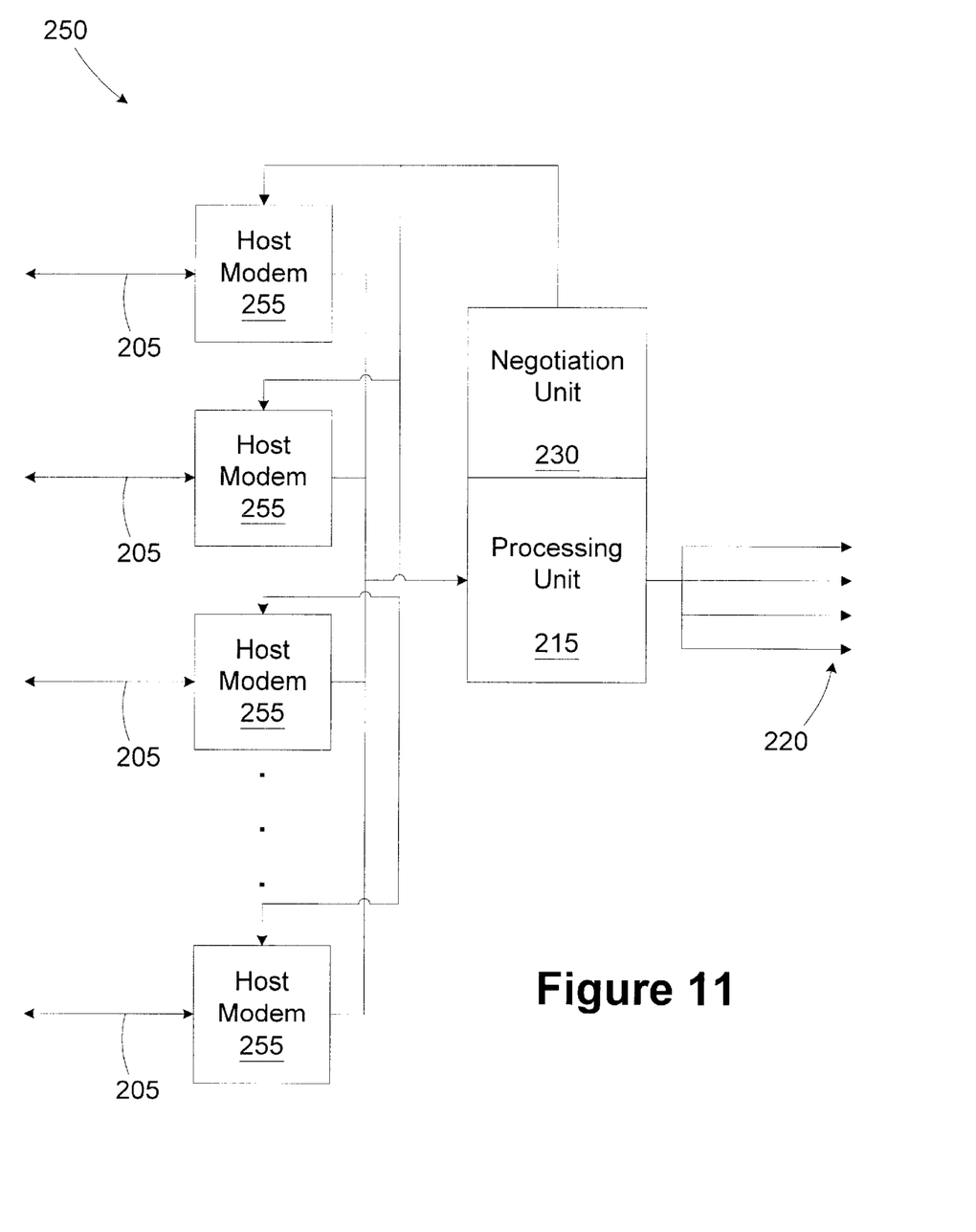
FIG. 11 is a block diagram of an alternative embodiment of the central office of FIG. 10.

The central office 200 is illustrated as a shared modem resource, however, as illustrated in FIG. 11, it is contemplated that an alternative embodiment of the central office 250 may include stand-alone host modems 255 with a shared processing unit 215 and/or negotiation unit 230. The processing unit 215 and negotiation unit 230 cooperate as described above in reference to FIG. 10 to allocate processing resources (i.e., by scaling bandwidth) to the host modems 255. Referring back to FIG. 3, the negotiation unit 230 provides negotiation data to the internal negotiation unit 45 of the individual host modem 255 based on the amount of resources available to the processing unit 215.

Figure 12:
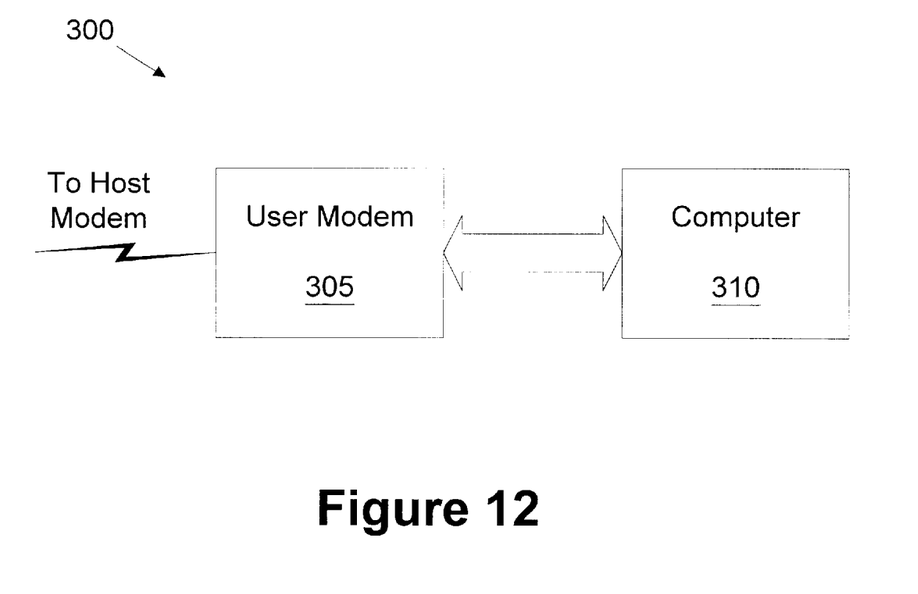
FIG. 12 is a block diagram of a user installation.

Referring to FIG. 12, a block diagram of a user installation 300 is provided. A user modem 305 is coupled to a computer 310. The computer 310 may comprise a desktop computer, notebook computer, minicomputer, or the like. For purposes of illustration, the computer 310 is described hereinafter as a personal computer running an operating system, such as Windows® 95, sold by Microsoft® Corporation. The user modem 305 is a high bandwidth ASDL modem such as the type described in reference to FIG. 3.

The high bandwidth of the user modem 305 presents a significant load to the operating system of the computer 310. Certain interactions with the operating system, including processing load, maximum throughput, and minimum latency, determine the ability of the operating system and computer 310 to support the modem 305 bandwidth. If sufficient resources do not exist to support the modem 305, the operating system may function poorly, or the operating system may fault and cease functioning.

Operating parameters, such as the speed of the central processing unit (CPU) (not shown) of the computer 310, the bandwidth of various buses (not shown) within the computer 310, the amount of memory (not shown), and the amount of available memory (i.e., based on the number of applications and/or drivers executing on the computer 310), affect the amount of total resources available to the computer 310 for supporting the modem 305.

Figure 13:
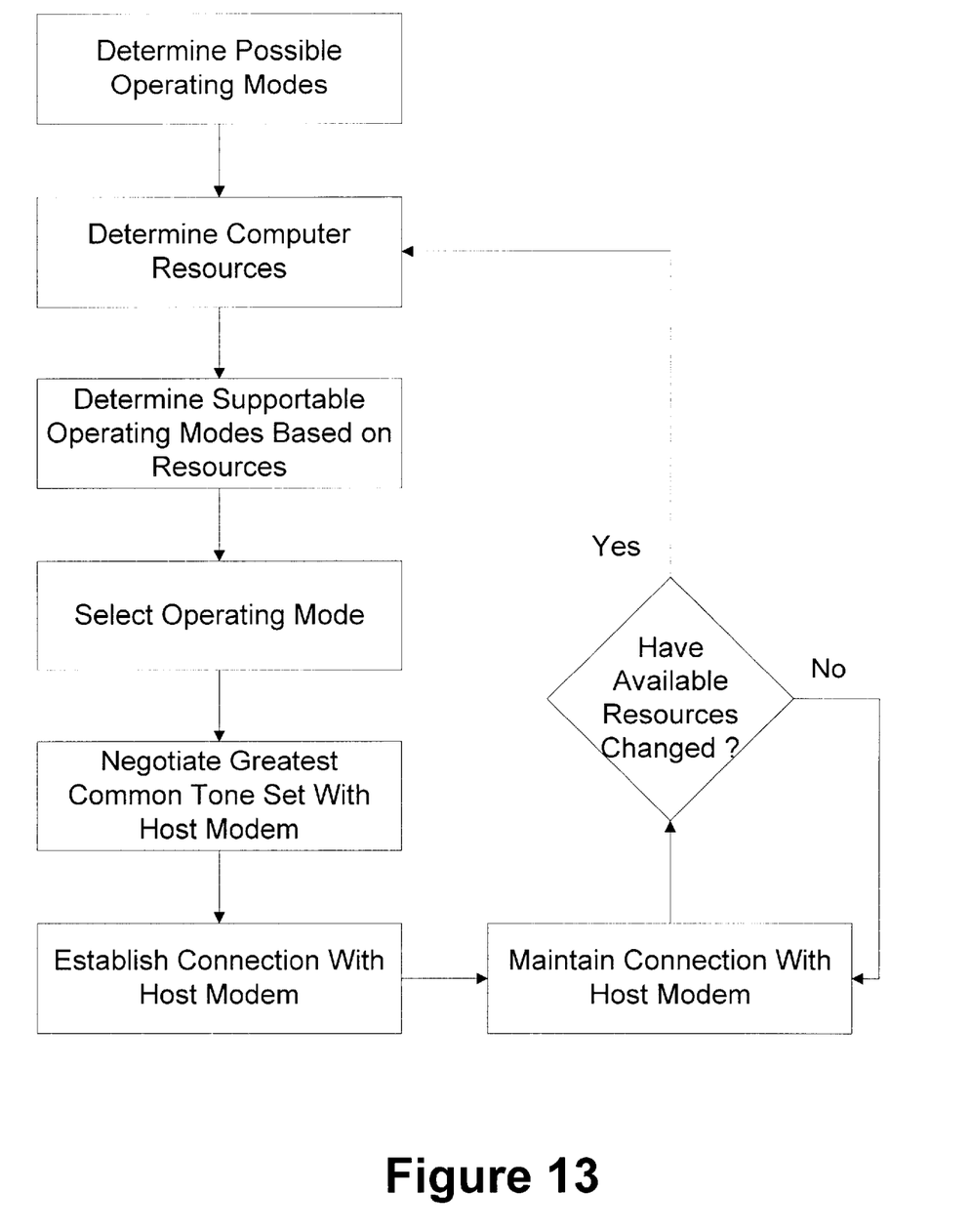
FIG. 13 is a flow diagram of a method for selecting the operating mode of the user modem of FIG. 12.

FIG. 13 illustrates a flow diagram of a method for determining the operating mode of the user modem 305. The modem 305 is capable of operating using different parameter sets. For example, the modem 305 may be capable of operating in one or all of the modes illustrated by FIGS. 1 and 5–9. Each parameter set, i.e., operating mode, has an associated processing load, maximum throughput, and average and worst case latency that the modem 305 can withstand. These parameter sets may be stored in a memory device (not shown) in the modem 305, in a program storage device (not shown) on the computer 310, or may be integrated with the modem 305 driver or operating software.

The computer 310 evaluates the parameter sets as possible operating modes for the modem 305. The computer 310 evaluates each parameter set against the resources available to the computer 310 and identifies those parameter sets that can be supported. The supportable parameter sets may be a subset of the possible operating modes. The modem 305 (or associated software application) will choose one of the supportable operating modes and communicate the selected operating mode to the computer 310.

In choosing the selected operating mode, the modem 305 (or associated software application) may be influenced by parameters specified by the user (e.g., the user may wish to maximize throughput, minimize CPU (not shown) usage, minimize interactivity, minimize power consumption, or some other parameter). The choice of the selected operating mode may also be influenced by factors such as the cost of bandwidth. In a situation where higher bandwidths cost higher rates, the user may select a lower cost operating mode. If the computer 310 is a notebook or portable computer, the user may select an operating mode having a smaller bandwidth. The lower bandwidth requires less power consumption because the CPU (not shown) usage is decreased. The lower power consumption may increase the operating time of the battery (not shown).

After choosing the operating mode, the negotiation unit 45 (as shown in FIG. 3) communicates with the interfacing host modem (not shown) to establish a greatest common tone set within the determined operating mode.

The computer 310 can request re-negotiation if the operating environment changes. For example, if the user changes the number of executing applications, the resources of the computer 310 may increase or decrease, accordingly. The computer 310 can re-evaluate the possible operating modes of the modem 305 and choose a new mode more compatible with the current operating environment.

Limiting the bandwidth of the user modem 300 has numerous advantages. Basing the operating mode of the modem 300 on the resources available to the computer 310 reduces the likelihood of the modem 305 overloading the computer 310 and causing operating problems, such as degraded performance, corruption of data, loss of connection, etc. Limiting the connection rate of the modem 305 based on the minimum latency that can be provided by the computer 310, reduces the likelihood of real-time software problems in the modem algorithm processing.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:
   a plurality of lines;
   a modulator/demodulator coupled to the lines and adapted to communicate data over the lines using a plurality of tone sets, each tone set being associated with a particular line;

a processing unit having an amount of available processing resources for supporting the modulator/demodulator and adapted to generate resource availability data based on the amount of available processing resources; and a negotiation unit adapted to receive the resource availability data from the processing unit and determine a subset of available tones within each tone set based on the resource availability data, wherein the modulator/demodulator is adapted to communicate data on each line using the subset of available tones.

2. The communication system of claim 1, wherein the modulator/demodulator comprises a plurality of host modems, each host modem being associated with one of the lines.

3. The communication system of claim 1, wherein each tone subset of available tones includes a maximum downstream tone and a maximum upstream tone.

4. The communication system of claim 1, wherein each tone subset of available tones includes a first usable tone.

5. The communication system of claim 3, wherein a tone comprises N times a predetermined frequency, and the value of N for the maximum downstream tone is less than 256.

6. The communication system of claim 3, wherein a tone comprises N times a predetermined frequency, and the value of N for the maximum upstream tone is less than 32.

7. The communication system of claim 4, wherein a tone comprises N times a predetermined frequency, and the value of N for the first useable tone is less than 8.

8. The communication system of claim 1, wherein a first subset of available tones is associated with a first line of the plurality of lines, a second subset of available tones is associated with a second line of the plurality of lines, and the number of tones in the first subset of available tones is greater than the number of tones in the second subset of available tones.

9. The communications system of claim 1, wherein the modulator/demodulator is further adapted to transmit data using the first subset of available tones receive data using the second subset of available tones.

10. A communications system, comprising:

a plurality of lines;

means for communicating data over the lines using a plurality of tone sets, each tone set being associated with a particular line;

means for generating resource availability data based on an amount of available processing resources; and means for determining a subset of available tones within each tone set based on the resource availability data, wherein the means for communicating communicates data on each line using the subset of available tones.

11. A method for allocating the resources of a communications system, the method comprising:

determining an amount of available processing resources for a processing unit, the processing unit being adapted to support a plurality of connections over a plurality of lines, each connection having an associated tone set for communicating data;

establishing a first connection over a first line;

allocating a first portion of the available processing resources to the first connection; and determining a first tone range based on the first portion, the first tone range being a subset of the tone set associated with the first line.

12. The method of claim 11, further comprising:

establishing a second connection over a second line;

allocating a second portion of the available processing resources to the second connection; and determining a second tone range based on the second portion, the second tone range being a subset of the tone set associated with the second line.

13. The method of claim 12, wherein determining the second tone range includes determining the second tone range based on the second portion, the size of the second tone range being less than the size of the first tone range.

14. The method of claim 11, further comprising negotiating a first common tone set with a first user modem coupled to the first line.

15. The method of claim 14, wherein negotiating the first common tone set includes intersecting the first tone range with a first available tone range associated with the first user modem.

16. The method of claim 14, further comprising communicating data over the first connection using the first common tone set.

17. The method of claim 14, wherein negotiating the first common tone set includes negotiating a maximum downstream tone.

18. The method of claim 14, wherein negotiating the first common tone set includes negotiating a maximum upstream tone.

19. The method of claim 14, wherein negotiating the first common tone set includes negotiating a first usable upstream tone.

20. A communication system, comprising:

a processing unit having an amount of available processing resources and adapted to generate resource availability data based on the amount of available processing resources;

a plurality of modems coupled to the processing unit, each modem being capable of communicating data using a set of tones; and a negotiation unit adapted to receive the resource availability data and determine a subset of available tones from the set of tones for each modem, the number of tones in each subset being based on the resource availability data.

* * * * *